United States Patent [19]

Niemeyer, III

[11] Patent Number: 4,853,714
[45] Date of Patent: Aug. 1, 1989

[54] AUTOMATIC PEN TYPE SENSOR FOR GRAPHIC RECORDER

[75] Inventor: Robert H. Niemeyer, III, Beaverton, Oreg.

[73] Assignee: AM International Corporation, Chicago, Ill.

[21] Appl. No.: 206,707

[22] Filed: Jun. 16, 1988

Related U.S. Application Data

[63] Continuation-in-part of Ser. No. 75,430, Jul. 20, 1987, Pat. No. 4,794,406.

[51] Int. Cl.[4] ...................... G01D 15/24; G01D 9/30; G06K 15/00
[52] U.S. Cl. ................................ 346/139 R; 364/520; 346/49
[58] Field of Search .................. 346/139 R, 29, 46, 49, 346/140 R, 108, 141; 364/520

[56] References Cited

U.S. PATENT DOCUMENTS

4,567,565 1/1986 Haselby ................................ 364/520
4,677,572 6/1987 Gunderson ...................... 346/139 R Primary Examiner—E. A. Goldberg
Assistant Examiner—Mark Reinhart
Attorney, Agent, or Firm—Roy A. Ekstrand; Nicholas A. Camasto

[57] ABSTRACT

An automatic pen positioning system is operative within a graphic recording system having a plurality of recording pens moveably supported by a pen carriage. The pen carriage is moveably along a first path above a media which is moveable along a second path. A motor drive system moves a selected one of the plurality of pens into contact with the media during recording. A closed loop servo system is operative upon the pen motor drive and is controlled by a position information processor. A following error processor is coupled to the servo system and compiles a periodically sampled table of absolute position, commanded position and following error for the servo system during the initialization process in which each pen is moved toward the media at a constant velocity until it impacts the media impeding further pen motion. The following error processor determines the pen to media contact position of the engaged pen on the basis of the information derived from the servo system. A pen type sensor responds to media contact position and determines pen type in accordance with a plurality of contact point ranges stored in a look-up table. The appropriate pen pressure for the pen is applied in response to the pen type sensor input. Each pen is subjected to the initialization process to establish its pen to media contact position and pen type when first used during a plot.

11 Claims, 5 Drawing Sheets

| TIME | Abs Pos | Com Pos | FE | FE Δ |
|---|---|---|---|---|
| 0 | 10 | 11 | 1 | 0 |
| 1 | 11 | 12 | 1 | 0 |
| 2 | 12 | 13 | 1 | 0 |
| 3 | 13 | 14 | 1 | 0 |
| 4 | 14 | 15 | 1 | 0 |
| 5 | 15 | 16 | 1 | 0 |
| 6 | 16 | 17 | 1 | 0 |
| 500 | 510 | 511 | 1 | 0 |
| 501 | 511 | 512 | 1 | 0 |
| 502 | 512 | 513 | 1 | 0 |
| 503 | 513 | 514 | 1 | 0 |
| 504 | 513 | 515 | 2 | 1 |
| 505 | 513 | 516 | 3 | 2 |
| 506 | 513 | 517 | 4 | 3 |
| 507 | 513 | 518 | 5 | 4 |
| 508 | 513 | 519 | 6 | 5 |

FIG. 6

AUTOMATIC PEN TYPE SENSOR FOR GRAPHIC RECORDER

CROSS REFERENCED TO RELATED APPLICATIONS

This application is a continuation in part of a copending application entitled AUTOMATIC PEN POSITIONER FOR GRAPHIC RECORDER, filed July 20, 1987, in the name of Robert H. Niemeyer III, serial number 07/075,430 now U.S. Pat. No. 4,794,406, and assigned to the assignee of the present application and which is hereby incorporated herein by reference.

This application discloses apparatus described and claimed in a related copending application entitled ROTARY ACTION GRAPHIC RECORDING SYSTEM, filed July 20, 1987 in the name of Robert Niemyer 111, serial number 07/075,533 now U.S. Pat. No. 4,763,140 which is assigned to the assignee of the present application and which is incorporated herein by reference.

FIELD OF THE INVENTION

This invention relates generally to graphic recording systems and particularly to those utilizing a moveable recording element, such as a pen.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction together with a moveable pen carriage supported above the media. Control means provide motion of the pen carriage in a second direction relative to the media. In most instances, the directions of media movement and pen carriage movement are orthogonal.

With the development of computer drive systems for such graphic recorders having increased capability and computing power, various systems have been provided which employ a plurality of recording pens supported upon the pen carriage. Generally, multiple pen systems are used to permit the selection from among a plurality of recording pens on the carriage having different colors. As an integral part of the operation of a multiple pen recording system, means are provided which selectively engage a single pen and move it to a position for recording upon the media. The remaining pens are maintained in positions out of contact with the media to ensure that only the selected pen engages and records upon the media.

With the introduction of multiple pen recording systems and the concurrent introduction of mechanisms to move the selected pen into contact with the media, there arose a need to accommodate various tolerances and variables within the recording system to ensure the accurate positioning of the pen or other recording element upon the media. Accurate pen to media contact is subject to several sources of difficulty which include different thicknesses of recording media and mechanical tolerances within the pen movement and control system. In addition, the majority of recording elements change point length due to wear during use. The combined effect of these variables requires that the position of the pen, with respect to the media, be periodically adjusted for optimum recording.

In addition to placement of the pen or recording element upon the media, the system requires that the appropriate pressure between the recording element and the media be applied and maintained to ensure proper recording. The latter requirement creates an additional variable within the system in that different combinations of media and recording element type require different contact pressures to assure proper recording. For example, recording pens having ball-type writing mechanisms generally require greater pen pressure against the media than those having porous fiber elements. These requirements have prompted practitioners in the art to devise various systems of pen motion and control in an attempt to accurately and reliably place the recording element against the media and apply the appropriate writing pressure. Such systems have included linear magnetic motor or voice coil moving mechanisms, or electrically operated solenoid coil systems to move the pen or recording element from its idle position above the media surface to contact with the media. In attempts to provide compensation for the above-described variables of system tolerances, recording element wear, and media thickness, practitioners in the art have often employed a spring biasing system within the pen movement mean to provide system "give" and maintain a predetermined spring force between the recording element and the media which in turn becomes the writing force of the recording system.

The above-referenced copending application sets forth an automatic pen positioning system in which a digital logic control system having the ability to compensate for the variables to which the system is subjected, such as system tolerances and media thickness, and compensate for wear of the recording element while applying a controlled precise contact pressure between the recording element and the media.

The system set forth in the above-referenced copending application is operative in a graphic recorder having and including a motor drive moving a recording pen into contact with recording media and a servo control system operative upon the motor drive to control pen motion. Limit means establish a recording pen travel reference point and move the recording pen toward the media at a predetermined velocity. Sensing means are coupled to the servo control system and detect the response of the servo control system to the obstruction of recording pen motion at media contact. A reference point is established when a recording pen obstruction is sensed which is used to control subsequent pen motion to media contact.

While the foregoing described systems provide some improvement in graphic recorder operation, their arises a further need for recording pen control systems which adjust for the writing characteristics of different recording pen types.

SUMMARY OF THE INVENTION

Accordingly, it is a general object of the present invention to provide an improved graphic recording system It is a more particular object of the present invention to provide an improved means for controlling the writing force of a recording pen in contact with the media which includes automatically applying a predetermined recording pressure to the pen which is appropriate for the recording pen type.

In accordance with the invention, there is provided for use in a graphic recorder having motor drive means for moving a recording pen into contact with a media, pen type sensing means comprising means for establishing the point of recording pen travel corresponding to the point of media contact, means for causing the recording pen travels for different pen types to occur within corresponding separated ranges indicative of pen type, and means for recognizing pen type by pen travel distance.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
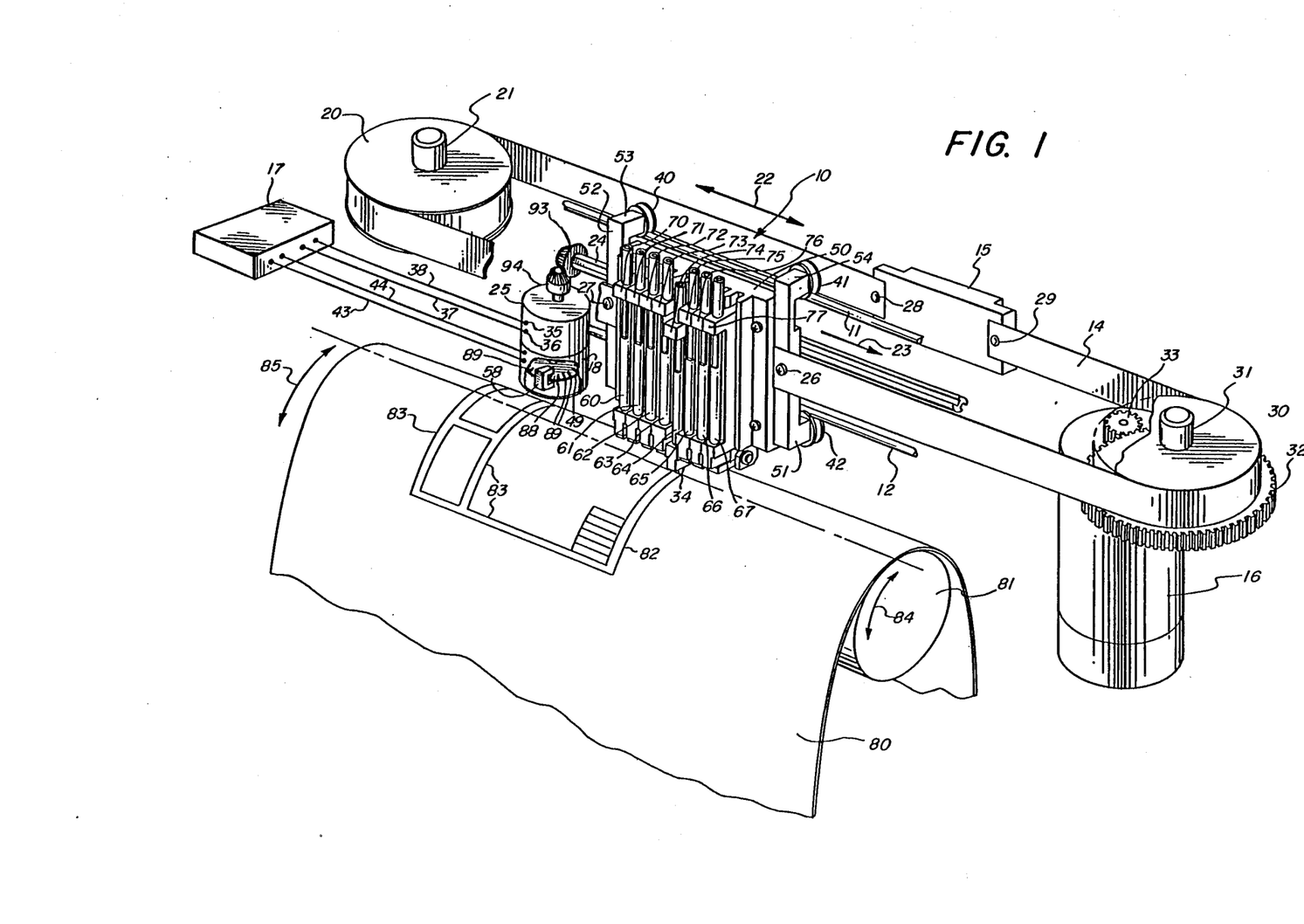
FIG. 1 is a partially sectioned perspective view of a graphic recorder and automatic pen type sensor constructed in accordance with the present invention.

FIG. 1 sets forth a perspective view of a graphic recording system having an automatic pen type sensor constructed in accordance with the present invention in which a moveable pen carriage generally referenced by numeral 10 is secured to and controlled by a closed flexible carriage band 14. Carriage band 14 may be fabricated from any number of flexible strong materials. However, in its preferred form it comprises a generally flat ribbon-like band of stainless steel. An upper track 11 and lower track 12 are supported parallel to the motion path of the forward portion of carriage band 14 by means not shown.

Pen carriage 10 includes a pen shuttle guide 50 formed of a lightweight, rigid plastic material. A pair of generally U-shaped wheel support members, 51 and 52, are secured to pen shuttle guide 50. Wheel support 51 terminates at one end in a rearwardly extending axle support 54 and at the other end in a similar axle support 55. Wheel support 52 is identical to wheel support 51 and terminates at one end in a rearwardly extending axle support 53 and a rearwardly extending axle support 56 at the other end. A quartet of grooved wheels 40, 41, 42, and 43 are rotatably secured to axle supports 53, 54, 55, and 56 respectively. Wheels 40 through 43 are configured to receive and provide a track engagement with upper track 11 and lower track 12. The resulting cooperation of wheels 40 through 48 and tracks 11 and 12 retains pen carriage 10 in a rolling engagement with upper track 10 and lower track 12 such that pen carriage 10 is freely moveable in the directions indicated by arrows 23 and 24.

Pen carriage 10 supports a plurality of generally elongated pen shuttles 70 through 77 which are moveably secured to pen shuttle guide 50 in a linear array. Pen shuttles 70 through 77 are generally perpendicular to the direction of travel of pen carriage 10. Pen shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position while pen 64 is supported in its downwardly extending position.

A media drive roller 81, which may be constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

A pair of pulleys 20 and 80 are rotatably supported by a pair of pulley supports 21 and 81 respectively. By means not shown but which may include any conventional pulley support mechanism, pulleys 20 and 30 are supported at opposite ends of the travel path of carriage band 14. The respective ends of carriage band 14 are joined by a pair of fasteners 28 and 29 to an elongated counter weight 15. Except for the gap at counterweight 15, carriage band 14 comprises a continuous ribbon of material extending from fastener 25 around pulley 20 through pen carriage 10 and around drive pulley 80 to fastener 26.

Pulley 20 comprises a free moving idler pulley while drive pulley 80 supports a ring gear 32. A carriage motor 16 supports a drive gear 88 which in accordance with generally accepted principles of graphic recorder construction is operatively coupled to the armature of carriage motor 16 (not shown) such that energizing carriage motor 16 results in rotating gear 33. Drive pulley 30 is supported with respect to gear 33 such that gear 38 engages gear 32 causing drive pulley 30 to rotate in response to energizing of carriage motor 16. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10. Actuator beam 13 is coupled to a shaft drive 93 and is pivotally supported at its other end by means not shown. Actuator beam 13 is operatively coupleable to selected ones of pen shuttles 70 through 77 to produce vertical motion of a selected one of pens 60 through 67.

A pen drive motor 25 comprises a conventional bidirectional DC motor which in turn supports a drive gear 94 coupled to and engaging shaft drive 93. The combination of motor drive 94 and shaft drive 93 form a conventional right angle drive coupling in which the rotational motion of motor drive 94 causes a corresponding rotational motion of actuator beam 13. Motor 25 further includes a pair of electrical connections 35 and 36 to which a pair of conductive wires 38 and 87 are coupled. An optical encoder 18 is coupled to and supported upon motor 25 and comprises a conventional direct driven optical encoder having an encoder disk 49 and an encoder sensor assembly 58. Encoder disk 49 is coupled to the armature (not shown) of motor 25 and supports a plurality of interleaved areas of different optical character 88 and 89. It will be apparent to those skilled in the art that any number of encoder structures may be substituted for encoder 18. However, it has been found advantageous to utilize an optical encoder.

A computer control 17, the details of which are set forth below, is coupled to encoder 18 by a pair of conductors 43 and 44 and to motor 16 by a pair of conductors 37 and 38.

In operation, recording commences upon the selection of one recording pen on pen carriage 10. Thereafter, by means described below and better seen in FIGS. 2 and 3, rotary actuator 90 is positioned for engagement with a selected pen and engages the pen shuttle supporting the selected pen such as pen 64 and pen shuttle 74 as shown in FIG. 1. Thereafter, controller 17 commences an initialization process in which motor 25 is driven at a constant velocity which in turn, through the coupling formed by drive 94 and 98, rotates actuator beam 13, which in turn drives rotary actuator 90 against pen shuttle 74 of the selected pen 64 and moves pen 64 toward media 80. The downward motion of pen 64 continues until the pen point, in this case, tip 34 of pen 64, contacts media 80. Thereafter, and in accordance with an important aspect of the present invention, controller 17 continues for a brief interval to energize motor 25 at a constant velocity. As a result, the contact of pen tip 34 against media 80 provides an obstruction which prohibits further motion of motor 25. During the brief interval in which motor 25 is obstructed from further motion, the reaction of controller 17 is sensed by means set forth below in greater detail and the position of contact between pen tip 34 and media 80 is determined in response to the operation of controller 17 to the obstruction of pen motion. The position of pen contact for pen 64 with media 80 is thereafter maintained as the reference position for contact of tip 34 whenever pen 64 is used. Once the reference position is established for a selected pen, the initialization process for that pen is complete and the normal plotting process is carried forward. Note that the movement of pen carriage 10 is parallel to drum 81 and therefore parallel to media 80. The position of pen tip 34 on the media may be determined by controller 17 at any position that pen tip 34 may be recording on media 80 It should also be noted that, once controller 17 has established the reference or contact position for one of the recording pens 60 through 67 within pen carriage 10, the pen engaging process for that pen is carried forward more efficiently in that controller 17 may quickly move the previously used pen directly to the referrence position at speeds greater than the normal sensing pen velocity.

In accordance with an important aspect of the present invention described below in detail, the reference position corresponding to the point of media contact is examined to determine the type of recording element within the pen. There after, control 17 applies a predetermined power level to motor 25 to apply the predetermined and appropriate contact pressure against the media for the recording element. For example, pens having porous recording elements are mechanically configured to have different media contact points than those having ball-type recording elements. Once controller 17 senses the media contact point for a pen, a determination of pen type is made and the lighter pressure used for porous pens or the heavier pressure used for ball-type is applied appropriately.

Once the selected pen has been initialized and its pen type determined, additional control means constructed in accordance with generally accepted graphic recording system techniques are operative to cause motor 16 to drive carriage band 14 and thereby pen carriage 10 back and forth along the travel path indicated by arrows 23 and 24 to produce motion of pen carriage 10 in either of two directions along the carriage travel path. Concurrently, means (not shown) are operatively coupled to medium roller 81 through conventional fabrication techniques to rotate media roller 81 in either of the directions indicated by arrow 84 and cause a corresponding motion of media 80 in either of the directions indicated by arrow 85.

By means set forth in greater detail in the above-referenced copending application for ROTARY ACTION GRAPHIC RECORDING SYSTEM, a selected pen shuttle such as pen 64 is moved under the control of contreller 17 by rotation of actuator beam 13 in a downward direction until pen point 34 of pen 64 contacts the surface of media 80. Thereafter, combinations of pen carriage motion in directions indicated by arrows 23 and 24 together with coordinated motions of media 80 in the directions indicated by arrow 85 result in recording a plurality of line markings 88 upon media.80.

Pens 60 through 67 most commonly comprise recording pens which are selected to provide different color recording pens. However, in some applications, pens 60 through 67 may comprise pens having different pen widths or recording character. In accordance with an important aspect of the present invention, the type of each pen is individually determined by controller 17 and the different writing characteristics of each pen is accommodated. The initialization process of the present invention system accurately determines the contact point of the pen tip and the media, adjusts for variations of pen tip wear and different types of pen dimensions, and determines the pen type.

Figure 2:
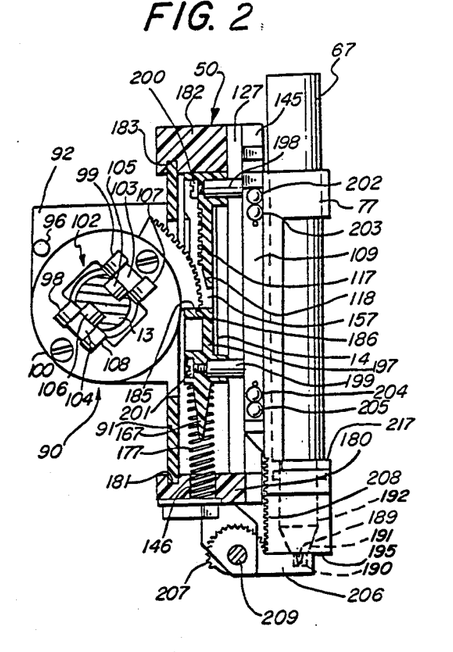
FIG. 2 is a partial section view of a portion of the graphic recorder shown in FIG. 1.
Figure 3:
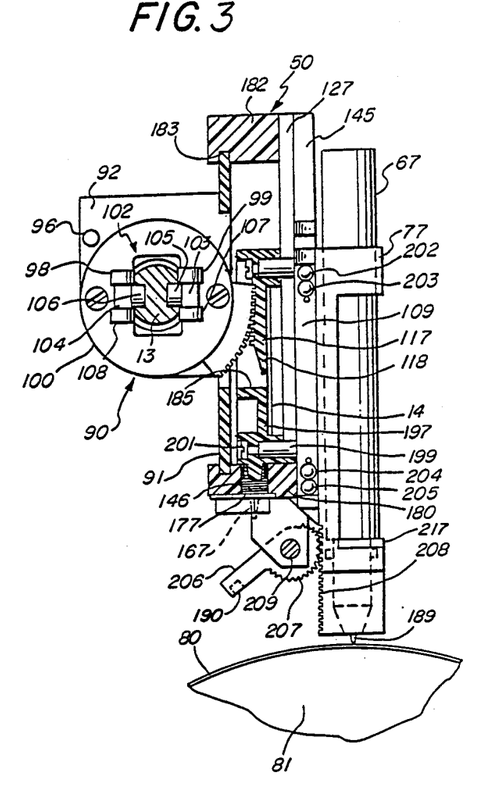
FIG. 3 is a partial section view of a portion of the graphic recorder shown in FIG. 1.

FIGS. 2 and 3 set forth partially sectioned views of pen carriage 10 and rotary drive 90 and depict different vertical positions of rotary drive 90. FIG. 2 sets forth the rotary actuator in the rest position in which a selected pen has been engaged but is not moved into the recording position. FIG. 3 sets forth the rotary actuator with the selected pen in the write or record position.

With respect to FIG. 2, pen shuttle guide 50 defines a top 182 having an upwardly extending channel 183 and a base 180 having a downwardly extending channel 181. Pen shuttle guide 50 defines a pen channel 127, the structure of which is set forth above. Pen shuttle 77 supports pen 60 in a vertical position and defines a pair of inwardly extending generally cylindrical bosses 198 and 199. Pen shuttle 77 further supports a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and sec cured thereto by a pair of threaded fasteners 200 and 201. Pen shuttle back 197 defines an aperture 157 within which gear rack 117 is supported. Gear rack 117 defines a generally tapered surface 118. A generally flat edge 185 forms the bottom surface of aperture 187. Pen shuttle back 197 further defines a generally conical, downwardly extending spring guide 167 Base 180 further defines a recess 146. A coiled spring 177 is compressively supported at one end within recess 146 and at the other end by its encircling of spring guide 167. Actuator beam 13 extends through aperture 184 in rotary drive housing 100 and is engaged by bearings 105 through 108 which permit free motion of drive 90 with respect to actuator beam 13. Drive housing 100 is supported by support flange 92 and gear 95 extends outwardly from drive housing 100.

Pen shuttle 77 further supports a pen shuttle door 206 which is pivotally supported by a pin 209 and defines a pen cap recess 190 and a gear portion 207. As is better seen in FIGS. 4A through 4C, a pen cavity 192 receives the recording end !94 of pen 67 and defines an aperture 191 aligned with pen cap recess 190. Pen 67 defines a recording tip 189 which extends from recording end 194 through aperture 191 and into pen cap recess 190. Pen shuttle 77 also defines a bottom surface 195 and a gear rack 208 extending upwardly therefrom.

In the position shown in FIG. 2, rotary drive 90 is in the rest position in which gear 95 extends into aperture 157 of pen shuttle back 197 and in which brake 102 is disengaged from actuator beam 13. In this position, rotary drive 90 is freely carried by the motion of pen carriage 10 and pen 67 is removed from contact with the media. Gear 95 defines a lower edge 186 which, in the rest position, is in contact with lower edge 185 of aperture 157. The compressive force of spring 177 urges pen shuttle 77 upwardly to a position in which the upper portion of pen shuttle back 197 abuts the under surface of top 182 of pen shuttle guide 50. Once actuator beam 18 is rotated due to the energizing of motor 25 in the clockwise direction causing drive housing 100 and gear 95 to be rotated in the clockwise direction, a downward force is applied to edge 185 of aperture 157 by edge 186 of gear 95. This force overcomes the force of spring 177 and begins the movement of pen shuttle back 197 and thereby pen shuttle 77 and pen 67 downwardly. With continued rotation of drive housing 100, gear 98 engages gear rack 117 and the downward motion of pen shuttle 77 continues.

Pen suttle door 206 is supported in close proximity to pen shuttle 77 such that gear portion 207 engages gear rack 208. As a result, the rotational position of pen shuttle door 206 is controlled by the vertical movement of pen shuttle 77. In the position shown in FIG. 2, pen shuttle door 206 is closed against bottom surface 195 which in turn encloses pen tip 189 within pen cap recess 190. As pen shuttle 77 is moved downward, gear portion 207 and gear rack 208 cooperate to rotate pen shuttle door 206 away from pen shuttle 77 until the fully open position shown in FIG. 3 is attained.

In FIG. 3, pen 67 has been moved to its recording position by the clockwise rotation of drive housing 100 causing gear 95 and rack 117 to cooperate to drive pen shuttle 77 downward until point 189 of pen 67 contacts the media 80 which is supported upon drum 81. It should be noted that in the position shown in FIG. 3, brake 102 is out of contact with actuator beam 18 and rotary drive 90 is released from any engagement with actuator beam 13. This permits the above-described motion of the combination of rotary drive 90 and pen carriage 10 as pen 67 is used to record upon the media.

Figure 4A:
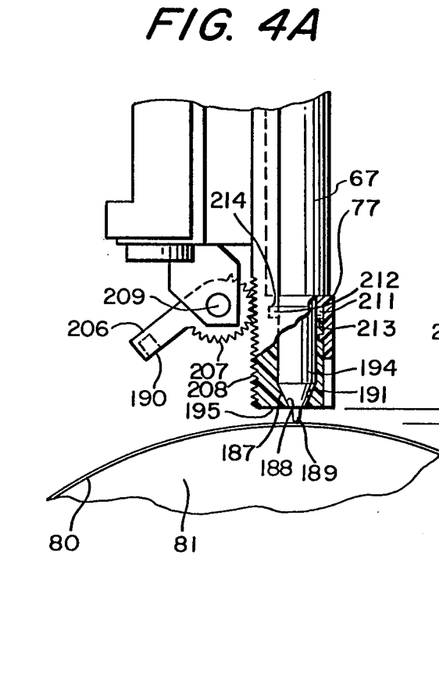
FIGS. 4A, 4B and 4C are partial section views of a portion of the graphic recorder shown in FIG. 1 depicting different recording pen lengths.
Figure 4B:
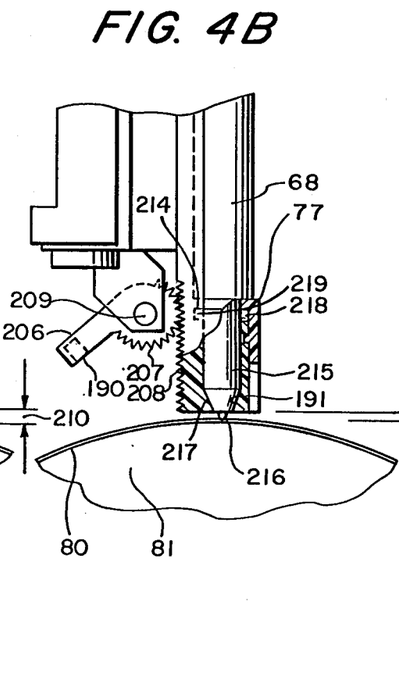

FIGS. 4A, 4B and 40 set forth differing pen structures which in accordance with the present invention utilize different recording element tips. It should be noted that the recording pens in FIGS. 4A, 4B and 40 are all received within pen shuttle 77 and differ primarily in the lengths or extensions of their respective pen tips. As Will be set forth below in greater detail and in accordance with an important aspect of the present invention, the use of different pen tip lengths results in correspondingly different recording positions of pen shuttle 77 with respect to the media and its supporting drum and with respect to pen carriage 10. As mentioned above and as is set forth below in greater detail, computer control 17 (seen in FIG. 1 and 5) uses the differences in pen carriage position to determine the pen type supported within pen shuttle 77. FIG. 4A sets forth a partially sectioned view of the lower end of pen shuttle 77 supporting recording pen 67. Pen shuttle 77 defines a generally cylindrical pen cavity 182 having a bottom surface 188. Pen cavity 192 further defines a pair of outwardly extending notches 213 and 214 and an aperture 191. Pen shuttle 77 further defines a bottom surface 195 and a gear rack 208. Pen cap door 206 define s a pen cap recess 190 and a gear portion 207. A pin 209 supports pen cap door 206 in a pivotal attachment. Pen 67 defines a recording end 194 having a pair of outwardly extending lock tabs 211 and 212 which are received within notches 213 and 214. Recording end 194 defines a bottom surface 187 and pen cavity 192 defines a surface 188. In the assembled position shown, pen 67 is supported and captivated within pen shuttle 77 such that recording end 194 is received within pen cavity 192 and surfaces 187 and 188 are in abutment by the cooperation of lock tabs 211 and 212 with notches 213 and 214 respectively. Pen 67 further define s downwardly extending pen tip 189 which extends from surface 187 through aperture 191 in pen shuttle 77 and beyond bottom surface 195 thereof. In accordance with an important aspect of the present invention, the extension of pen tip 189 beyond bottom surface 195 of pen shuttle 77 determines the resulting distance 210 which occurs when pen tip 189 contacts media 80 upon drum 81. In accordance with an important aspect of the present invention and as is set forth below in greater detail, the downward travel of pen shuttle 77 with respect to pen carriage 10, which is evidenced by distance 220 between bottom surface 195 and media 80, is directly related to the length of pen tip 189. Thus, in the position shown in FIG. 4A and with pen 67 having pen tip 189 supported within pen shuttle 77, a reference distance is established which is unique to recording pens having the pen tip extension of pen tip 189.

FIG. 4B sets forth pen shuttle 77 in the identical position set forth above for FIG. 4A with the exception that a recording pen 68 replaces recording pen 67 within pen shuttle 77 Accordingly, pen 68 defines a pair of outwardly extending lock tabs 218 and 219 received within notches 213 and 214 respectively of pen shuttle 77. Pen 68 further defines a recording end 215 received within pen cavity 192 In further accordance, pen 68 defines a bottom surface 217 which abuts surface 188 of pen cavity 192. As thus far described, pen 68 is identical to pen 67 and is received and secured within pen shuttle 77 in the identical manner In departure from pen 67, pen 68 defines a pen tip 216 extending through aperture 191 having a substantially shorter extension than pen tip 189 of pen 67 As a result, pen shuttle 77 must be moved farther down toward drum 81 to cause pen tip 216 to contact media 80. This increased downward travel of pen shuttle 77 to provide media contact of pen tip 216 is evidenced by a smaller distance 220 between media 80 and bottom surface 195 of pen shuttle 77. In accordance with the invention and as referred to above and described below in greater detail, it will be apparent to those skilled in the art that while pens 67 and 68 may be interchangeably used in pen shuttle 77, the presence of either within pen shuttle 77 may be recognized by the different downward travels of pen shuttle 77 which result at the point of media contact of their respective pen tips. Accordingly and in further accordance with an important aspect of the present invention, controller 17 is able to determine which of pens 67 or 68 are present in pen shuttle 77 by comparing the downward travel of pen shuttle 77 at the point of media contact FIG. 4C sets forth pen shuttle 77 in the same position shown in FIGS. 4A and 4B with the exception that a third pen type exemplified by a pen 69 is received within pen shuttle 77. As described above for FIGS. 4A and 4B, the structure of pen shuttle 77 and pen cap door 206 remains the same with the sole difference in FIG. 40 being the use of a different pen type 69. Accordingly, pen type 69 includes a generally cylindrical recording end 224 having a pair of outwardly exending lock tabs 222 and 223 received within notches 213 and 214 respectively. Recording end 224 further defines a surface 225 which is secured in abutment with surface 188 of pen cavity 192. A pen tip 226 extends downwardly through aperture 191 and beyond bottom surface 195 of pen shuttle 77 pen 69 is representative of a pen type having a longer extension pen tip 226 than either pens 68 or 67. As a result and in similarity to the foregoing, the point at which pen tip 226 contacts media 80 determines a corresponding downward travel of pen shuttle 77. In further accordance with the foregoing, the downward travel of pen shuttle 77 at media contact is evidenced by a distance 230. It should be noted that distance 280 is greater than either distances 210 or 220 for recording pens 67 or 68 respectively.

Figure 4C:
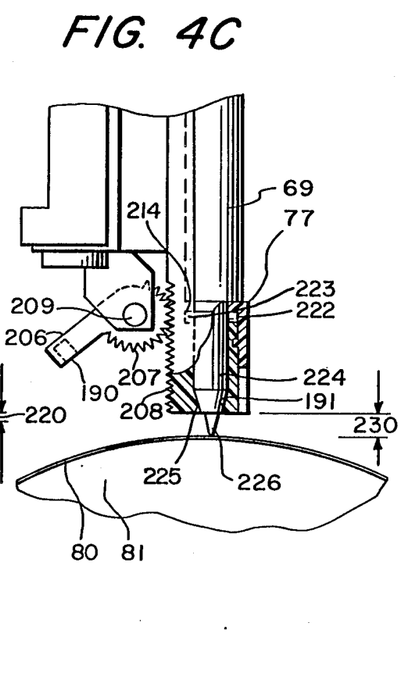

As a result and in accordance with the means set forth below in greater detail, the use of recording pens such as pens 67, 68 and 69 interchangeably within pen shuttle 77 having pen tip lengths which correspond to and are indicative of their particular recording element type results in corresponding pen shuttle travel distances at media contact which indicate the presence of a given pen type within pen shuttle 77. It should be noted that the relative lengths of pen tips used in FIGS. 4A, 4B and 4C are exaggerated to more clearly set forth the present invention operation. In operating systems it has been found that relatively small pen tip extension differences are sufficient to permit the system to discriminate between pen types.

Figure 5:
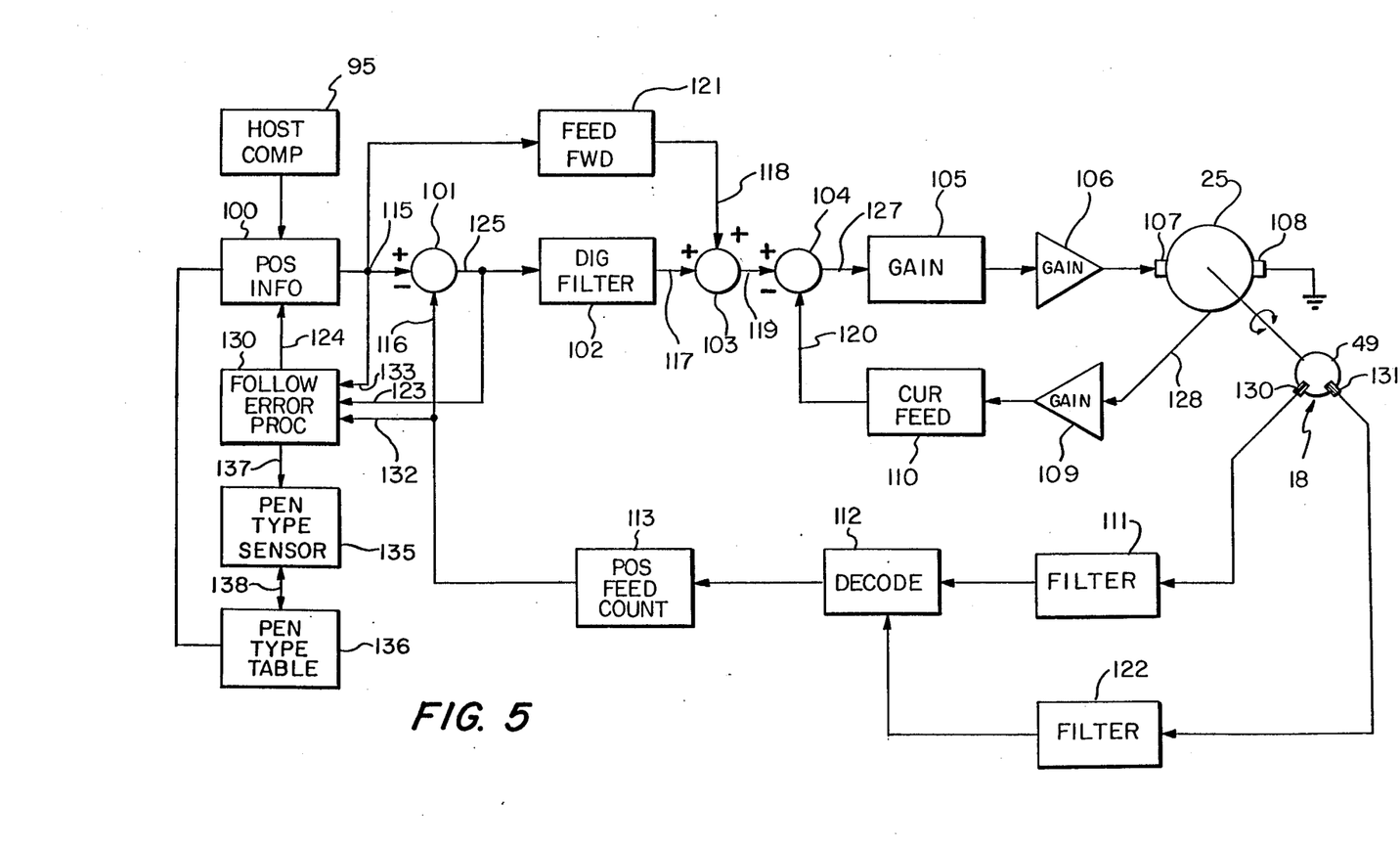
FIG. 5 is a block diagram of an automatic pen type sensor constructed in accordance with the present invention.

FIG. 5 sets forth a block diagram representation of computer controller 17 constructed in accordance with the present invention. A host computer 95 produces a series of digitally encoded information signals which define the set of instructions formulated to cause the graphic recorder to produce the desired image upon the media. A position information processor 100 is coupled to host computer 95 and receives the information signals together with identifying information which permits information processor 100 to select the necessary portions of the output of host computer 95 for processing by computer controller 17 to produce the desired motion of the selected one of pens 60 through 66 on pen carriage 10. While the information produced by host computer 95 varies, in general, the information presented to position information processor 100 includes data defining the selected one of the plurality of recording pens to be used together with vector information for the desired pen motion. Pen motion vector information, in essence, defines a starting point and a destination point for each motion of the selected pen. Position information processor 100 selects the pen vector information from the remainder of host computer output.

A comparator 101 has a negative input 116, a positive input 115 coupled to position information processor 100, and an output 125. A feedforward circuit 121 is coupled to position information processor 100. A digital filter 100 is coupled to output 125 of comparator 101. A comparator 103 has a positive input 117 coupled to digital filter 102, a positive input 118 coupled to feedforward circuit 121 and an output 126. A comparator 104 has a positive input coupled to output 126 of oomparator 103, a negative input 120 and an output 127. A gain circuit 105 is coupled to output 127 of comparator 104 and a current feedback counter 110 is coupled to negative input 120 of comparator 104. Amplifier 106 is coupled to gain circuit 105. A bidirectional DC motor 25 includes an armature terminal 107 coupled to amplifier 106 and an armature terminal 108 coupled to ground. Motor 25 further includes a back EMF output terminal 128. A feedback amplifier 109 is coupled to terminal 128 of motor 25 and to current feedback counter 110. An encoder 18 includes an encoder disk 49 and a sensor assembly 58 which supports a pair of optical sensors 130 and 131.

A position feedback counter 113 is coupled to negative input 116 of comparator 101. A decoder 112 is coupled to position feedback counter 113. A pair of noise filters 111 and 122 are coupled to decoder 112 and to sensors 130 and 131 of encoder 18 respectively. A following error processor 130 has an input 123 coupled to output 125 of comparator 101 and an output 124 coupled to position information processor 100.

A pen type sensor 135 has an input 137, an output 139 and an input/output 138. A pen type table 136 is coupled to pen type sensor 135 via input/output 138. Output 139 of pen type sensor 185 is coupled to position information processor 100.

In response to an instruction from host computer 95, position information processor 100 begins the initialization process for establishing the reference contact positions for the selected one of the pens 60 through 67 on pen carriage 10. While the initialization of the pens on pen carriage 10 may be carried forward in any sequence or manner, it has been found convenient to undertake initialization of each pen prior to its initial use. Accordingly and with temporary reference to FIGS. 1 through 3, host computer 95 initiates the pen selection process described in greater detail in the above-referenced copending application for rotary action graphic recording system in which motor 25 is energized to rotate actuator 90 to the position shown in FIG. 4 such that gear 95 is removed from engagement with pen carriage 10 and is fixed with respect to actuator beam 13. Thereafter, host computer 95 energizes carriage motor 25 to move pen carriage 10 into a position such that rotary drive 90 is aligned with the selected pen. With the appropriate alignment of rotary drive 90, motor 25 is energized to rotate actuator beam 13 and rotary drive 90 to the positions shown in FIG. 2.

Once the pen selection process is complete, host computer 95 provides information to position information processor 100 directing the completion of the initialization process for the selected pen. By means described below, controller 17 and host computer 95 cooperate to sequentially operate the selected pen through a motion cycle which establishes the reference or media contact point for the selected pen in the manner set forth in the above-referenced copending application for AUTOMATIC PEN POSITIONER FOR GRAPHIC RECORDER. In accordance with an important aspect of the present invention, the media contact point is used to determine pen type and to apply the appropriate pen pressure for recording.

At this point, it is believed that a general discussion of the operation of the servo control system of the present invention controller 17 and its establishment of a media contact point should be undertaken initially with discussions of the present invention pen type sensing system following thereafter.

Accordingly, with respect to pen motion generally, once a desired pen is engaged, host computer 95 initiates a set of instructions for position information processor 100 which define the desired pen motion. As mentioned above, the information provided by host computer 95 to position information processor 100 includes a vector definition of the desired pen motion together with speed and acceleration information. Position information processor 100 converts the applied vector speed and acceleration information into a series of commanded positions which are coupled to comparator 101. As described below, comparator 101 also receives the signals representing the actual position of motor 25 at input 116. In response, comparator 101 produces an output signal indicative of the difference between the commanded position and the actual position of motor pen carriage 10. This difference signal is referred to as the following error.

In addition, the commanded position signals from position information processor 100 are applied to feedforward circuit 121 In accordance with generally accepted fabrication of servo motor systems, feedforward circuit 121 couples a portion of the commanded position signal directly to one input of comparator 103. The remainder of output signal of comparator 101 is proceeded by digital filter 102 which provides compensation for irregularities in the processing system and avoids the system tendency to hunt and oscillate. In essence, digital filter 102 smoothes out or filters the control signal and determines the response time of the servo system. The filtered following error signal output of digital filter 102 is applied to input 117 of comparator 103 As should be noted, inputs 117 and 118 from digital filter 102 and feedforward circuit 121 respectively, are in phase inputs or positive phase inputs. As a result, the output of comparator 103 in essence is an additive combination of the filtered output of digital filter 102 and feedforward circuit 121 which is applied to input 119 of comparator 104. The output signal of comparator 104 is amplified by successive gain stages 105 and 106 and applied to armature terminal 107 of motor 16. In accordance with conventional DC motor construction motor 25 responds to the applied signal from amplifier 106 to produce armature motion.

A conventional feedback sensor 128 within motor 25 senses the back electromotive force (EMF) produced by motor 25 during its rotation in the form of a proportional voltage which is coupled to feedback amplifier 109. It should be noted that in accordance with conventional servo motor techniques, sensor 128 produces a voltage proportional to the back EMF of motor 25 which in turn is proportional to the rotational speed of the motor. As a result, the output of feedback amplifier 109 comprises a voltage proportional to the speed of motor 25 which is applied to current feedback counter 110. An analog to digital conversion of the back EMF indicative signal is performed by feedback counter 110 producing a digital signal indicative of the speed of motor 25. The output of current feedback counter 110 is coupled to negative input 120 of comparator 104 completing the feedback path for the motor. The feedback system formed by sensor 128, feedback amplifier 109, current feedback counter 110 and comparator 104 is operative at a substantially higher cycle frequency than the remainder of the servo system to provide a limited effect, high speed control loop operative upon motor 25. The use of this high speed loop compensates for minor variations encountered by the pen drive system such as friction within the system, minor inaccuracies of system mechanical parts, or system wear. It should be noted that the high speed feedback loop is operative solely in response to speed of motor 25 and is not coupled to or fed from encoder 18.

In addition to producing the back EMF used in the above-described feedback, rotation of motor 25's armature also rotates encoder disk 49 which in accordance with the above-described operation of optical encoder 18, produces output signals at sensors 130 and 131. In accordance with conventional servo control loop construction, sensors 130 and 131 are spaced with respect to each other and encoder disk 49 such that their output signals are in quadrature phase. As a result, the optical encoder signals applied to noise filters 111 and 122 are in quadrature. Noise filters 111 and 122 perform substantially the same functions of filtering or removing noise from the encoder output signals. The filtered quadrature signals are passed by noise filters 111 and 122 to the inputs of a quadrature decoder 112 which, in accordance with conventional quadrature detector operation, produces an output signal indicative of both the motion of encoder disk 49 and its direction. The output of decoder 112 is applied to position feedback counter 110 which functions to accumulate and periodically update an encoder signal count which is in direct correspondence to the movement of encoder disk 49 and thereby the position of the engaged pen.

As a result, the output signal of position feedback counter 113 represents the actual position of the engaged pen which is applied to negative input 116 of comparator 101. As described above, comparator 101 produces an output signal at terminal 125 indicative of the difference between the signal applied to input terminals 115 and 116 which forms the following error of the system. As is known, closed loop servo systems of the type shown in FIG. 5, function in a manner whereby the system is constantly and dynamically moving toward a commanded position. However, because the gain of the feedback system loop is finite, there exists a difference between the commanded position and the actual position at any given time until the system is brought to rest.

This difference or lag of the loop servo system is always present, except for periods when the engaged pen is at rest at a commanded position. In essence, the system is controlled by providing a series of commanded positions which the servo system moves toward but which it constantly lags behind.

In summary therefore, pen motion of a selected pen is carried forward as position information processor 100 produces a set of output instructions to digital filter 102 and feedforward circuit 121 which establishes downward pen motion. In accordance with the basic operation of the servo system described above, the output signals from position information processor 100 are coupled by digital filter 102 and feedforward circuit 121 to comparator 103 in which they are added and coupled by comparator 104 through consecutive gain circuits 105 and 106 to energize motor 25. The back EMF signal produced by motor 25 is sensed by sensor 128 and coupled through feedback amplifier 109 and current feedback counter 110 to provide a negative feedback signal for comparator 104. The high speed loop formed by feedback amplifier 109, current feedback counter 110 and gain stages 105 and 106 and comparator 104 accommodate minor variations in the load upon motor 25. In addition, rotation of motor 25 rotates encoder disk 49 producing a pair of quadrature phased output signals which are coupled by noise filters 111 and 122 to decoder 112. Decoder 112 produces an output signal indicative of the direction and relative motion of encoder 18 which are then used to update position feedback counter 113 as it maintains an ongoing count of engaged pen position. The output signal of feedback counter 113 is applied to comparator 101 and to following error processor 130. The actual position feedback signal is compared to the commanded position by comparator 101 and an output signal comprising the following error of the system is produced at output 125.

During the initialization process in which the media contact point for the engaged pen is undertaken, position information processor 100 produces a set of commanded positions which result in downward motion of the engaged pen at a predetermined constant velocity in the absence of pen motion obstruction caused by media contact, the foregoing process continues as position information processor 100 continues to output constant velocity commanded positions just ahead of the actual position causing the servo loop to respond with continued motion of motor 25 and downward motion of the engaged pen.

During servo loop operation, following error processor 130 receives input signals at input 132 indicative of the actual position of the engaged pen, the following error signal at input 123, and the commanded position signals produced by position information circuit 100 at input 133. As the engaged pen continues to move downwardly at the established constant velocity under the control of position information circuit 100 and the foregoing described servo loop operation, following error processor 130 provides periodic sampling of the above input signals and compiles a table of information as shown in FIG. 6.

Figure 6:
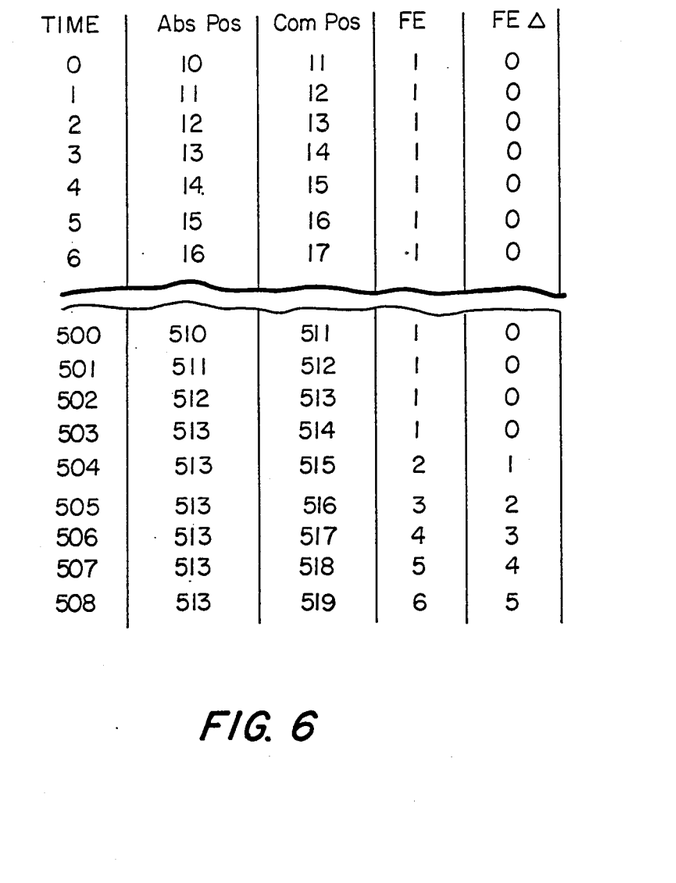
FIG. 6 is a data table for an automatic pen type sensor constructed in accordance with the present invention.

FIG. 6 sets forth a representation of the information compiled within following error processor 130 during the initialization process. The sampled absolute position, commanded position and following error are shown in FIG. 6 corresponding under their corresponding labeled headings. Times 0 through 6 are representative of the sequence produced which may for example correspond to the initiation of engaged pen motion from the uppermost starting position of the engaged pen represented by a position of 10. In such case, the commanded position produced by position information processor 100 to develop a constant velocity motion of the engaged pen will be 11. In accordance with the above-described servo system operation, the difference between the commanded position and the absolute position describes the following error of the system. In this instance, the difference is 1 which appears in the column under the heading marked following error. At time 1, a second cycle of the above sampling takes place in which the absolute position has changed from 10 to 11. During that same time, in accordance with constant velocity operation, the commanded position changed from 11 to 12 which again results in a following error of 1. This process in which the absolute position and commanded position differ by 1 resulting in following errors of 1 continues through times 2, 3, 4, 5 and 6 and so on. So long as the engaged pen is in motion, this process continues and following error remains 1. After some period of time, (indicated by the break in the table of FIG. 6) a later time such as the time 500 or the 500th cycling of the sampling system is reached in which case the absolute position has become 510 and the commanded position has become 511. In similarity to the foregoing computation, the difference between commanded position and absolute position, that is, the following error remains 1. This process again continues to repeat through times 501, 502 and 503.

In addition to the foregoing accumulation of data as to time, absolute position, commanded position and following error, following error processor 130 performs an additional calculation in accordance with an important aspect of the present invention. During each sampling period, following error processor 130 further computes a following error delta entry which comprises the difference in following error between the present sample time and the following error which preceded the sample time by a predetermined number of cycles (base sample). The selection of time interval between the present following error and the base following error used in computing following error delta is to a large extent empirical and is therefore a matter of optimization of design for a given system. The factors which contribute to this determination are those which describe the degree of flexibility or give in the driven system. For the purpose of this example, it has been determined that the foregoing described pen moving structure is optimized by using an interval of 5 cycles between the present sampling of following error and the base following error. As a result, at each sampling time, following error processor 130 calculates the difference between the following error in that present sampling time and the following error which occurred during the base sample time (5 cycles earlier). In other words, at sample time 500 in which the following error is 1, the following error delta results from a subtraction of the following error existing at time 500 from the following error sampling 5 cycles earlier or time 495. As mentioned above, in the absence of an obstruction, the motion of the engaged pen is a constant velocity motion in which the difference between commanded position and absolute position, that is, the following error, remains 1. As a result, while not shown on FIG. 6 due to the break in the table, it will be apparent to those skilled in the art that if the operation set forth in times 0 through 6 continued through to time 500, the following error would also be 1 at time 495. In such case, the following error delta at time 500 is 1—1 or 0.

The above-described operation continues and the information is compiled within the memory in the form shown in FIG. 6. As a result, at time 501 through 503, the commanded position and actual position continue to be separated by 1 and the following error continues to be 1. Similarly, the difference between the following error at times 501 through 503 continues to be the same as that which occurred 5 cycles earlier and the following error delta continues to be 0.

At time 504 however, some event occurs in the motion of the engaged pen in which the absolute position remains 513 notwithstanding the incrementing of the commanded position from 514 to 515. As a result, the following error increases at time 504 from 1 to 2. Since the base following error 5 cycles earlier is 1 the difference or delta of following error has increased from 0 to 1. At time 505, a position of the engaged pen remains the same at 513 notwithstanding the incrementing of commanded position to 516. As a result, the following error again increases from 2 to 3 and the following error delta increases from 1 to 2. At times 506 the absolute or actual position of the engaged pen remains fixed at 513 while the commanded position continues to increase in accordance with the normal constant velocity operation from 516 to 517. As a result, from time 504 through 506 each succeeding time has produced a commanded position increasing by 1 while the absolute position has remained constant since the following error increments 1 number each cycle from 4 through 18. Correspondingly, the following error delta increases by 1 during each sampling from the following error delta of 2 at time 504 to a following error delta of 4 at time 506.

In accordance with an important aspect of the present invention, a maximum following error delta is established within following error processor 130. The purpose of the maximum following error is to cause the system to initiate a media contact determination. The maximum following error delta is also empirically derived. For the mechanical construction and drive system of the pen moving mechanism in the present invention embodiment, a maximum following error delta of 5 has been established to trigger media contact determination. As can be seen, the increasing following error delta reaches 5 at time 508. In response, following error processor 130 establishes the media contact or reference point of the initialization process for the engaged pen to correspond to the actual position of the pen at the base time corresponding to the sample time at which the following error delta reached 5. That is to say, a reference point for the pen to media contact is established at position 513. Following error processor 130 then communicates the information indicating that the pen to media contact occurred at the pen position at time interval 503. This provides the above-described pen to media contact reference point for the engaged pen.

In accordance with an important aspect of the present invention, the media contact point for the engaged pen is coupled by following error processor 130 to pen type sensor 135 at input 137. Pen type sensor 135 is coupled to pen type table 136 by an input/output coupling 138. Pen type table 136 comprises a look-up table within which a plurality of ranges of media contact points are organized together with corresponding indicators of Pen types. As a result, the media contact point of a pen secured within a pen shuttle of the above-described system is, in accordance with an important aspect of the present invention, characterized as to pen type by comparison of its media contact point with the stored sets of media contact point ranges within pen type table 136 Accordingly, once the media contact point for an engaged pen having been determined by the foregoing described operation is communicated to pen type sene or 135, an examination of the pen media contact ranges within pen type table 136 permits pen type sensor 135 to determine the pen type. Once the pen type has been determined, pen type sensor 135 provides an output signal which is coupled to position information processor 100 at input 139 which indicates the pen type. In response to the pen type signal, position information processor 100 produces output signals which by the above-described servo control system operation cause motor 25 to be energized and apply a precisely controlled pen pressure upon the media. Therefore and with temporary reference to FIGS. 4A through 4C, it should be noted that in accordance with an important aspect of the present invention, the appropriate pen pressure may be automatically provided by the present invention system by coordinating the mechanical configuration of the recording pen to the desired or optimum pen recording pressure. If, for example, FIG. 4A depicts a recording pen having a porous fiber recording element for pen tip 189, the foregoing described system operation provides the media contact point corresponding to absolute position 513 due to the mechanical configuration of pen 67. Accordingly, pen type table 136 is organized such that absolute position of media contact 513 falls Within the range of media contact points corresponding to pen 67's pen type. Thus, the mechanical configuration of pen 67, which results in distance 210 between pen shuttle 77 and media 80, provides the present invention control system with a reliable indication of pen type and thereby pen recording pressure to be applied. Continuing with the example of FIGS. 4A through 4C and with respect to FIG. 4B specifically, it will be re called that pen 68 having a mechanical configuration which produces a media contact at a reduced distance 220 between pen shuttle 77 and media 80 in turn produces a media contact point having a greater absolute position than that determined for pen 67. Accordingly, the media contact point which, for example, may be 713 rather than 513, would upon examination within pen type table 136, fall within a group of media contact points different from that within which the media contact point of pen 67 occurred. If, for example pen 68 utilizes a ball-type recording element for pen tip 216, pen type sensor 135 upon examination of pen type table 136 provides an indication to position information processor 139 that a ball type recording element is being used and a greater pen to media pressure is applied.

Similarly, in the event pen 69 shown in FIG. 4C is of a type using a relatively soft porous fiber recording element for pen tip 226, the increased extension of pen tip 226 results in the occurrence of media contact at an absolute position substantially less than the 513 position obtained for pen 67 in FIG. 4A which may, for example, be 418 rather than 518. In the same manner described above, once a media contact point of 413 is communicated to pen type sensor 135, the examination of pen type table 186 determines that the media contact point falls within a third media contact group corresponding to the pen type for pen 69. Accordingly, the pen type information is provided by pen type sensor 135 to position information processor 100 and an appropriately lighter media contact pressure is applied to pen 69.

As a result, the present invention system is operative to provide the appropriate contact pressure to a variety of pen types so long as the mechanical configurations of the pens in use are selected to coordinate the resulting media contact point to the particular pen type.

Once the media contact position and pen type are established for the engaged pen, they are stored in memory and no further pen type or media contact information is necessary for the operation of the recording system using the engaged pen. The initialization process is repeated each time a pen is engaged for the first time to establish the media contact point and pen type. Thereafter, the pens carried by pen carriage 10 used throughout the graphic recording process are selected and brought into contact with media 80 by controller 17 by simply engaging the desired pen and moving it immediately to its previously established media contact position and applying the appropriate pressure. Since the media contact point and pen type are retained by controller 17 after each pen's initialization, any initialized pen may be moved at a substantially greater velocity to the media contact point without fear of pen point damage. Once the engaged pen has been moved to the previously determined media contact point, controller 17 then implements the predetermined motor power level appropriate for the pen type to provide the suitable contact pressure for proper recording.

In accordance with an important aspect of the present invention, controller 17 cycles through an initialization process at the start of each graphic recording plot to automatically redefine the media contact point and pen type for each pen in accordance with the actual conditions of the pens. As a result, the changes of pen characteristic, such as point wear, are compensated for with a high degree of accuracy during the initialization processes which precede each plot.

What has been shown is a low cost easy to manufacture and reliable system for providing the appropriate recording pen pressure in moveable carriage type graphic recording systems which uses the mechanical configuration of the recording pens and the media contact positions established as a result thereof to identify pen type.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a graphic recorder having a recording pen and motor drive means for moving said recording pen to and from contact with recording media, servo control means operative upon the motor drive means to control recording pen motion, and pen positioning means for establishing a pen to media contact reference point, an automatic pen type sensor comprising:
means initiating pen motion toward the media causing said recording pen to contact the media and be obstructed from further movement thereby;
reference means establishing a pen to media contact reference point when said obstruction is sensed; and
pen type recognition means determining recording pen type in response to said media contact reference point.

2. An automatic pen type sensor as set forth in claim wherein said motor drive means includes a movable pen shuttle receiving said recording pen, said pen shuttle being moveable between a rest position and said media contact reference point.

3. An automatic pen type sensor as set forth in claim 2 wherein said recording pen defines a recording element tip for contacting and recording upon said media and wherein said recording pen is configured to extend said tip predetermined distance with respect to said pen shuttle which corresponds to the type of said recording element.

4. An automatic pen type sensor as set forth in claim 3 wherein said pen shuttle defines a pen receptacle and wherein said recording pen is removably received within said pen receptacle such that said recording element tip extends therefrom said predetermined distance.

5. An automatic pen type sensor as set forth in claim 4 wherein recording pen and said pen receptacle each define respective reference surfaces which abut when said pen is received within said pen receptacle and wherein said recording element tip extends from said reference surface of said recording pen a predetermined distance.

6. For use in an image recorder in which a imaging carriage is moved along a carriage path and in which a pen is moveably supported upon the carriage under the control of a motor drive and closed loop servo control system and in which the servo control system produces a series of commanded positions and means are provided to determine relative motion of the pen and establish a pen to media contact reference position, pen type sensing means comprising:
drive means for moving the pen in a direction toward the media such that pen contact with the media occurs obstructing further pen motion;
sensing means detecting the obstruction of said pen motion and establishing a media contact reference position for motion of said pen toward the media having a predetermined relationship to the position of the obstruction;
means defining a range of media contact reference positions in correspondence to a pen type;
means establishing a pen type signal for each recording pen having a media contact reference point within said range; and
means adjusting said image recorder in response to said pen type signal.

7. For use in a graphic recorder having a moveable pen carriage and means moveably supporting a recording media proximate to the pen carriage, pen type sensing means comprising:
a pen shuttle moveably supported upon said pen carriage defining a pen receptacle;
servo drive means coupled to said pen shuttle for moving it toward and away from said media;
a recording pen having a body defining an end portion configured to be received within said receptacle in a removeable locking attachment and having a recording element defining a recording element type extending from said end portion a predetermined distance selected to correspond to its type;
control means coupled to said servo drive means for causing pen shuttle motion to bring said recording element into contact with said media and establish a media contact point;

means for establishing a plurality of media contact point ranges each of which correspond to a particular recording element type; and type means for determining the recording element type of said recording pen by determining which of said media contact point ranges its media contact point falls within.

8. Pen type sensing means as set forth in claim 7 wherein said control means include means for applying a recording pressure between said recording element and said media and wherein said type means include means for producing a recording pressure signal for each of said ranges of media contact points.

9. Pen type sensing means as set forth in claim 8 wherein said pen receptacle defines a first reference surface and wherein said end portion of said recording pen defines a second reference surface, said first and second reference surfaces abutting to position said recording element with respect to said pen shuttle.

10. Pen type sensing means as set forth in claim 9 wherein said recording element extends from said second reference surface a predetermined distance corresponding to its recording element type.

11. Pen type sensing means as set forth in claim 10 wherein said first reference surface defines an aperture and wherein said recording element extends through said aperture when said pen is received within said receptacle.

* * * * *